Jan. 9, 1923.

V. C. JOHNSON.
LUGGAGE CARRIER.
FILED JUNE 17, 1920.

1,441,586.

Inventor
Victor C. Johnson
By R. S. Burns
Attorney.

Patented Jan. 9, 1923.

1,441,586

UNITED STATES PATENT OFFICE.

VICTOR C. JOHNSON, OF LOS ANGELES, CALIFORNIA.

LUGGAGE CARRIER.

Application filed June 17, 1920. Serial No. 389,695.

*To all whom it may concern:*

Be it known that I, VICTOR C. JOHNSON, a citizen of the United States, residing at Los Angeles, in the county of Los Angeles and State of California, have invented new and useful Improvements in Luggage Carriers, of which the following is a specification.

My invention is a luggage carrier particularly applicable to the running board of automobiles for carrying luggage on the running board.

The main object of my invention is to provide a luggage carrier which may be mounted on the running board of an automobile to be swung up along the outside of the running board and detachably secured to the fenders in position for use, and detached from the fenders and swung under the running board and secured in such position when it is not desired to use the carrier.

Other objects will appear hereinafter.

My invention consists in the features of construction, combination of elements and arrangement of parts hereinafter described and illustrated in the annexed drawing forming a part of this specification, in which.

Figure 1:
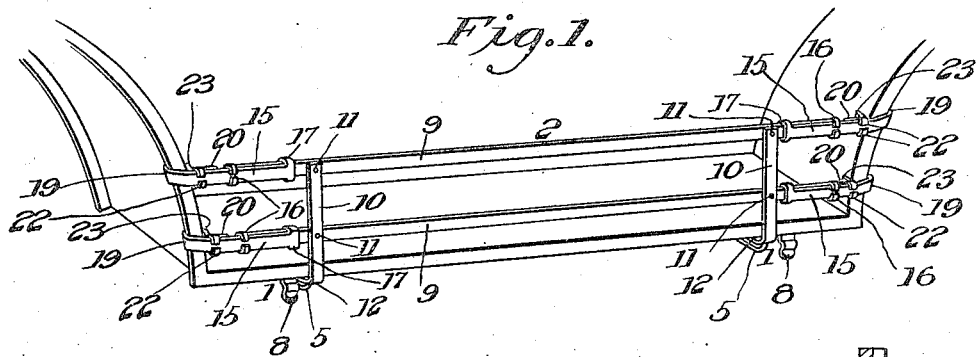
Figure 1 is a perspective view of my luggage carrier mounted on the running board of an automobile with the sliding frame drawn up along the outside of the running board and detachably secured to the fenders in position for use.

My luggage carrier includes a pair of supports 1 secured to the under side of the running board of an automobile near the ends thereof respectively and a sliding frame 2 slidably mounted on said supports so that it may be drawn outwardly and up along the outside of the running board in position for use or moved under the running board out of use. Each of the supports 1 includes a flat metal strip 3 secured to the under side of the running board transversely thereof by bolts 4 and a track rail 5 extending under said strip and bent upwardly and riveted at its ends in the ends of said strip, said track rail extending downwardly at a slight inclination from its inner to its outer end, and the inner end of the strip 3 extending downwardly at a slight angle. Spring arms 6 and 7 are bent downwardly from the strip 3 at one side thereof, the arm 6 being bent from the strip 3 near the outer end, and the arm 7 being bent downwardly from said strip rearwardly of the arm 6 at a slight rearward inclination. The arm 6 is bent in the form of a latch 8 at its lower end, and the lower end of the arm 7 is curved rearwardly and slightly upwardly. The sliding frame 2 includes a pair of longitudinal rails 9 and a pair of transversal rails 10 secured to the longitudinal rails by rivets 11. The upper end of the transverse rails 10 do not extend above the upper rails 9 but the lower portion of the transverse rails 10 extends below the lower longitudinal rails 9 and the lower ends 12 of said transverse rails are bent inwardly at right angles to said rails and are slidably mounted on the track rails 5 of the supports 1; said ends 12 being provided with an aperture 13 through which said track rails 5 extend. Extensions 15 are mounted on the ends of the longitudinal rails 9 to slide longitudinally thereof by means of lugs 16 bent transversely from the ends of the rails 9 around the outside of the extensions 15, and lugs 17 bent transversely from the inner end of the extensions 15 around the inside of the rails 9. The outer end of the extensions 15 are bent in the form of inwardly extending hooks 19 for engaging the edge of the automobile fenders. Clamps 20 are slidably mounted on the extensions 15 beyond the ends of the rails 9; said clamps each including a plate 21 slidably mounted on the inside of an extension 15 by means of lugs 22 bent transversely from the outer end of said plate around the outside of the extension, an inwardly extending clamping member 23 and a locking lever 24 pivoted in knuckles 25 on the inner end of the plate 21 by a pivot 26, a cam 27 being formed on the pivoted end of said locking lever for engaging the inner face of the extensions when the locking lever is swung inwardly whereby the plate 21 is locked at different clamping positions on the extensions.

Figure 2:
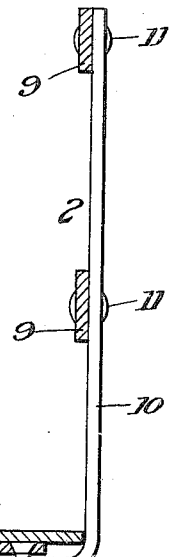
Figure 2 is a cross section of my luggage carrier mounted on the running board of an automobile with the sliding frame shown in full lines swung up along the outside of the running board in position for use and shown in dotted lines swung under the running board and secured in such position out of use.
Figure 3:
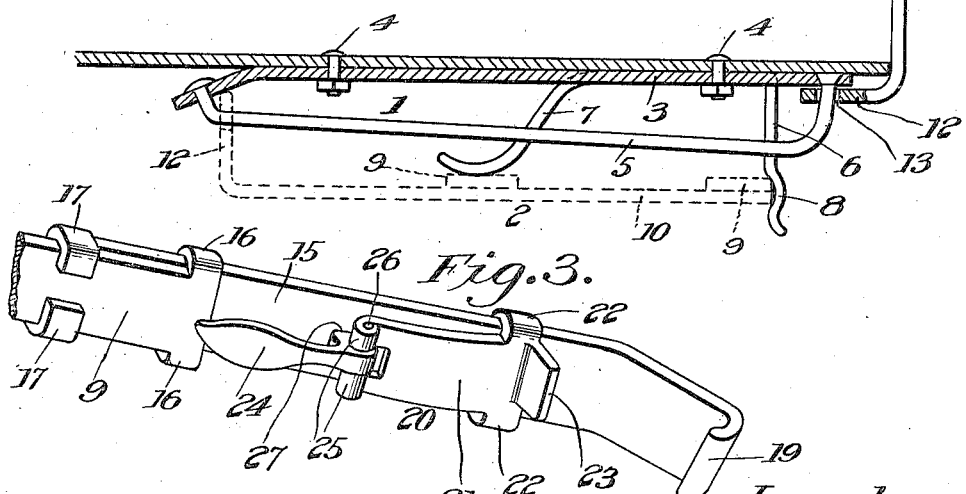
Figure 3 is a perspective view of one of the connecting elements for connecting the ends of the sliding frame to the automobile fenders.

Normally the frame 2 rests under the running board in the position shown in dotted lines in Figure 2, in which position the rear ends 12 of the transverse rails 10 engages the rear ends of the strip 3 and track rails 5, the latches 8 of the arms 6 engages the forward edge of the outer longitudinal rails 9, and the spring arms 7 engages the inner longitudinal rails 9; the arms 6 holding the forward side of the frame 2 upwardly and holding the frame in position under the running board with the inner ends 12 of the rails 10 in engagement with the inner end of the strip 3 and track 5, and the spring arms 7 holding the ends 12 firmly upon the track rails 5 and preventing rattling of the engaging parts of the support 1 and the frame 2.

When it is desired to use the carrier, the arm 6 is swung outwardly disengaging the latch 8 from the outer longitudinal rail 9 and disengaging the inner end of the arm 7 from the inner longitudinal rail 9; the frame 2 is then drawn outwardly and upwardly on the track rails 5 alongside and above the outside of the running board of the automobile; the extensions 15 are drawn outwardly into engagement with the outer edge of the automobile fenders; the clamps 20 are then moved outwardly along the extensions 15 until the clamping members 23 engage the inner edge of the fenders; and the locking levers 24 are swung inwardly so that the cams 27 engage the inner face of the extensions 15 and locking the clamping plates 21 on the extensions 15 with the hooks and the clamping members 23 clamping the outer and inner edges of the fenders, thus clamping the frame 2 to the fenders alongside the running board in position for use. The luggage placed on the running board is held thereon by means of the frame 2.

When it is desired not to use the carrier the clamps 20 are moved inwardly on the extensions 15, the hooks 19 of the extensions 15 are disengaged from the fenders; the frame swung outwardly and downwardly and moved inwardly on the rails 5 under the running board and secured in position under the running board by the arms 6 and held against rattling by the arms 7, as seen in dotted lines in Figure 2.

My luggage carrier is simple in construction, durable, may be manufactured and sold at a low cost, and may be applied to the running board of any automobile.

I claim:

A luggage carrier, comprising a pair of plates adapted to be attached to the underside of a running board, a rod on each of said plates forming slide rails having upturned forward end portions, a pair of bars adapted to be positioned vertically having their lower end portions bent and formed with apertures slidably engaging the slide bars, slats pivotally connecting said bent bars, means for detachably holding said slats and bent bars in a vertical position; said bent bars being adapted to be slid longitudinally of the guide bars to assume a horizontal position beneath the running board, and means for holding the panel formed by the bent bar and slats in its horizontal position.

VICTOR C. JOHNSON.